W. S. RUFFNER.
HUSKING TRUCK AND FODDER BINDER.
APPLICATION FILED FEB. 7, 1910.

981,477.

Patented Jan. 10, 1911.
3 SHEETS—SHEET 1.

Witnesses

Inventor
W. S. Ruffner
By Woodward & Chandlee
Attorneys

W. S. RUFFNER.
HUSKING TRUCK AND FODDER BINDER.
APPLICATION FILED FEB. 7, 1910.

981,477.

Patented Jan. 10, 1911.
3 SHEETS—SHEET 2.

Witnesses

Inventor
W. S. Ruffner
By Woodward & Chandlee
Attorneys

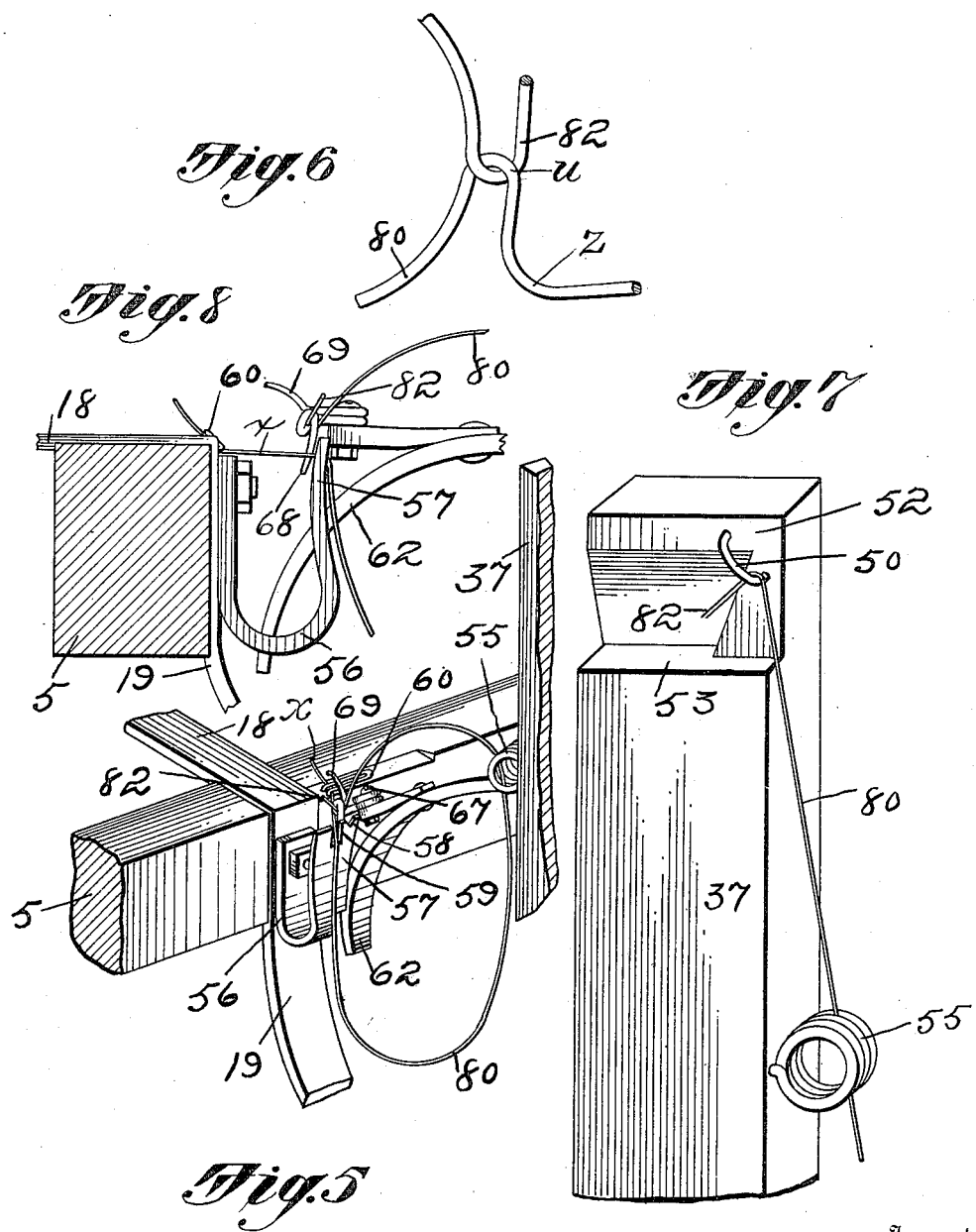

UNITED STATES PATENT OFFICE.

WILLIAM S. RUFFNER, OF PLEASANTVILLE, OHIO.

HUSKING-TRUCK AND FODDER-BINDER.

981,477. Specification of Letters Patent. Patented Jan. 10, 1911.

Application filed February 7, 1910. Serial No. 542,485.

*To all whom it may concern:*

Be it known that I, W. S. RUFFNER, a citizen of the United States, residing at Pleasantville, in the county of Fairfield and State of Ohio, have invented certain new and useful Improvements in Husking-Trucks and Fodder-Binders, of which the following is a specification.

This invention has relation to certain new and useful improvements in husking trucks and fodder binders.

The object of my invention is to provide a light, portable wheel supported machine arranged to be drawn through the field to be used as a work table upon which to dispose the stalks to be stripped, and including a tying mechanism so constructed that the stripped stalks can be readily and securely tied to form a shock or bundle.

With the above and other objects in view, the present invention consists in the combination and arrangement of parts as will be hereinafter more fully described and particularly pointed out in the appended claims, it being understood that changes in the specific structure shown and described may be made within the scope of the claims without departing from the spirit of the invention.

Figure 1:
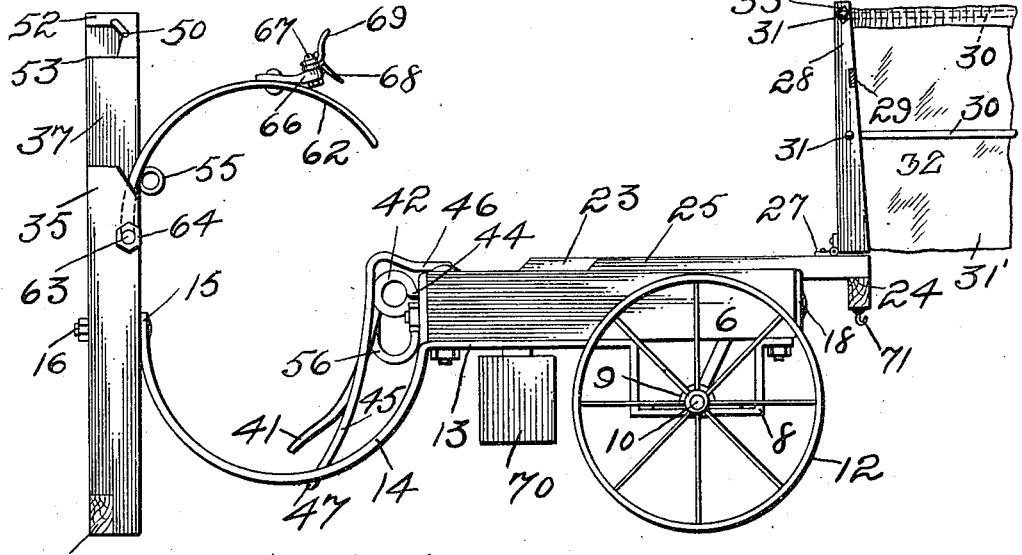
Figure 2:
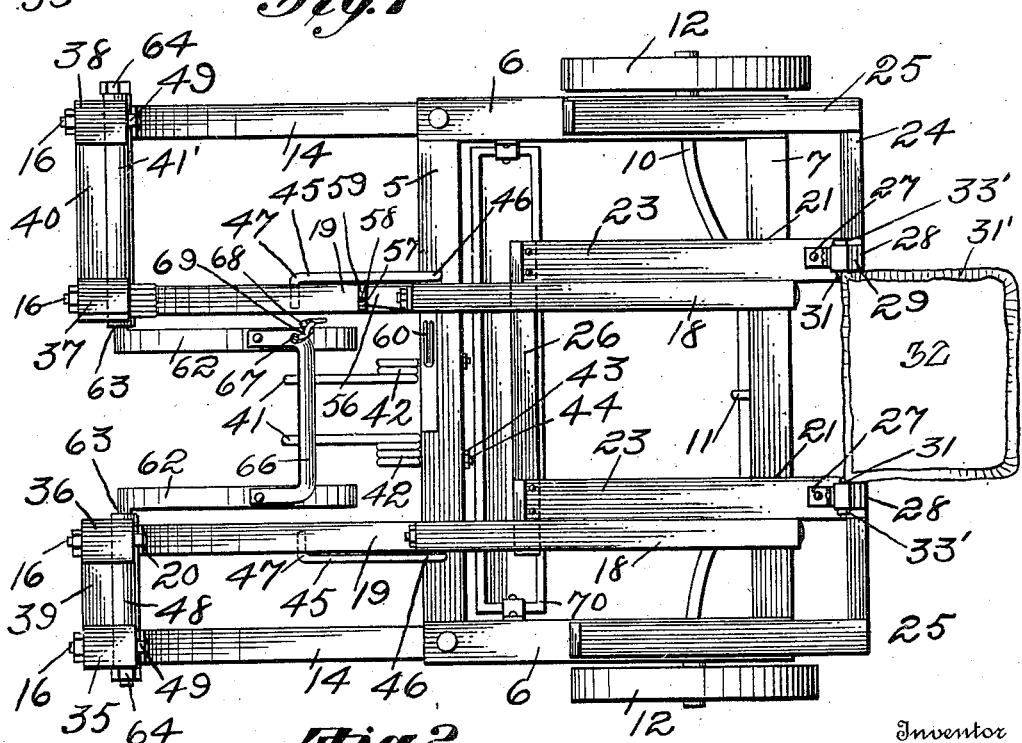
Figure 3:
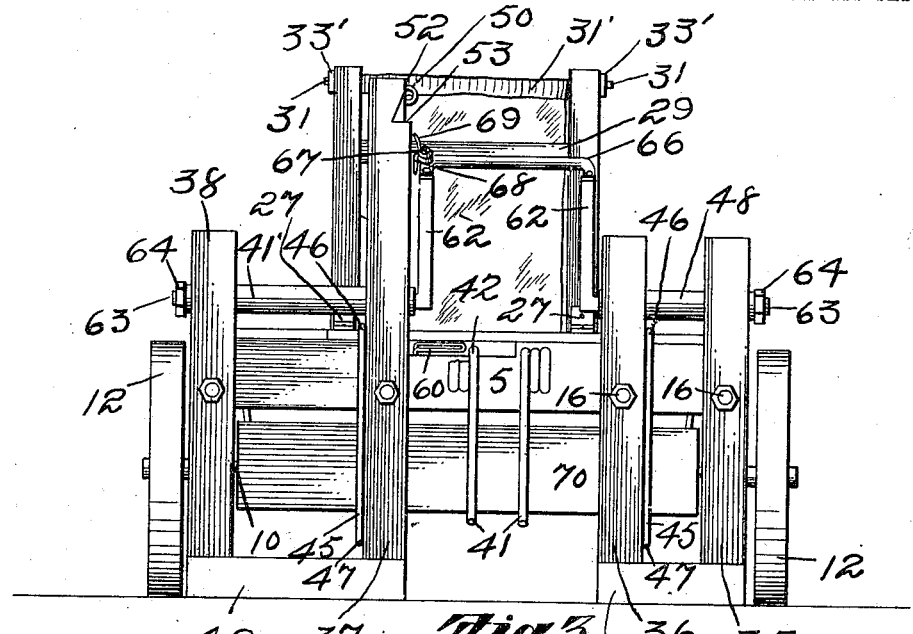
Figure 4:
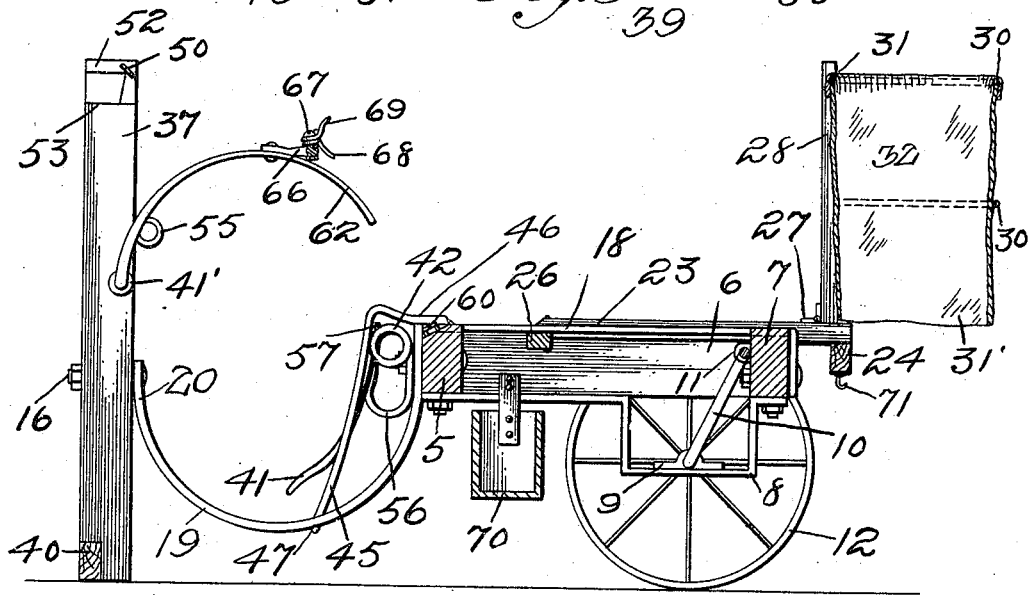

In the drawings forming a part of this specification, and in which like numerals of reference indicate similar parts in the several views, Figure 1 is a side view of a machine embodying my invention. Fig. 2 is a top view. Fig. 3 shows a front view. Fig. 4 discloses a middle lengthwise sectional view. Fig. 5 shows a detail view disclosing the made hook about to be brought into engagement with the hooked end of the tying member. Fig. 6 shows a fragmentary view disclosing the connected hooked ends of one of the tie wires. Fig. 7 shows a fragmentary view of the hook ended tying member as held within the supporting eye. Fig. 8 is a side elevation of a fractional part of the tying mechanism.

The aim of my invention, is to provide a machine by means of which the labor of husking corn and tying shocks or bundles is lightened and expedited, and in carrying out the object of my invention I employ a rectangular supporting frame including the two similar side bars 6, a front bar 5 and the rear bar 7. Secured to the side bars 6, are the three-sided brackets 8, provided with the bearings 9, arranged to receive the spindle ends of the cranked axle 10, which by means of the securing ear 11, is secured midlength to the rear frame member 7. This axle 10 carries the two supporting wheels 12.

As shown in the drawings, the brackets 8 are continued in the flat portions 13, which serve to strengthen the carrying frame, and which in front, are curved as shown at 14, having the terminal securing ends 15 with a suitable aperture to receive the securing bolts 16.

Extending from the rear frame member 7 to the forward frame member 5, are the two similar preferably flat metal bars 18, which also have their forwardly extending ends 19 downwardly curved and provided with a terminal portion 20 also secured by bolts 16.

The rear frame member 7 adjacent to the members 18, is provided with the seats 21, within which are slidably held the two intermediate bars 23, of the sliding rack, as used in my invention. These members 23 extend from the batten 24, which also gives support to the two end slats or bars 25. The intermediate bars 23 are connected by means of the transversely held brace 26 arranged to slide below the metal frame members 18. This construction permits the rack being carried backward and forward upon the carrying frame. The seats 21 prevent lateral displacement, the end slats 25 prevent a downward tilting and the frame bar 26 a tilting in an opposite direction of the rack.

Secured to the batten 24 by means of the hinges 27 are the standards 28 connected by means of the brace 29. These standards 28 carry the two rectangular wire frame members 30, having the trunnions forming ends 31 held within suitable openings of the standards 28. These frame members 30, two such members being used, support and carry the open ended fabric chute 31'. By means of the nuts 33' working upon the trunnions 31 these frame members 30 are securely held to the standard at any desired angle.

The bolts 16 held within the forward ends of the curved cradle forming members 14 and 19 upon one side receive the posts 35 and 36 respectively, while the members 14 and 19 upon the opposite side receive the posts 38 and 37. The posts 35 and 36 are connected by means of the sill 39, while the posts 38 and 37 are connected by means of the sill 40. By means of these members 14 and 19 and the posts just described, I form a cradle within which the material to be bound is collected. Secured to the front frame member 5 is the spring bar 41, which extends from the spring coil 42, which by means of the nut 43 has its stem 44 secured to this frame member 5. Two such spring bar members 41 are employed, these members being positioned between the two inner cradle arms. Adjacent to the two intermediate cradle arms 19, are positioned the guard forming bars 45, which have their upper ends 46 bent downward to work in a suitable opening of the front frame member 5, while the lower ends 47 of these guard bars are held below the cradle arms 19.

By the differently disposed bars 41 and 45 depending from their supporting frame it will be observed that the stalks are properly directed into the cradle for the subsequent tying of said stalks after the latter had been properly deposited.

The posts 35 and 36 are connected at their upper ends by means of the tube 48 held in position by means of the bolts 49, while the posts 37 and 38 are connected by means of the tube 41' near their upper ends, this tube being held by means of the bolt 49, similar to those supporting the opposite tube 48. Secured to the upper end of the post 37 is the supporting eye 50. This post 37, at its upper end, has the reduced extension 52 and a shoulder 53 being formed adjacent to which the extension 52 is provided with an approximately V-shaped recess, near the upper forward edge of which the supporting eye is located. At a suitable point below this eye, the post 37 is provided with the coil spring member 55, as shown in Fig. 7.

The cradle forming arm 19 connected to the post 37, carries the yoke 56 bent U-shaped and having one end 57 provided with the V-shaped seat 58 and the slot 59. As shown, the guard bars 45 extend in alinement with the forward portion of this yoke 56. Secured to the front frame member 5, adjacent to the yoke 56 is the spring holder 60.

Held within the tubes 48 and 41' is the compressing frame as used for my invention comprising two curved bars 62, each of which has a stem extension 63 which is threaded and arranged to pass through the connecting tube and being secured by means of a nut 64. These two similar members 62 are connected by means of the handle forming bar 66. This bar carries a bolt 67 and this bolt in turn carries the crimping member used to form a hook upon one end of the tying wire. As shown in Fig. 5, this member includes the downwardly directed hook 68, and the upwardly and laterally extending finger 69, the hook 68 being so positioned that the same will pass to the rear of and between the slot 59 and the seat 58.

Secured below the carrying frame, is a suitable box 70, within which the tying wires are carried, while secured to the batten 24 are suitable hooks 71 arranged to receive a bag which has its opposite ends secured to the chute and into which the husked corn ears are thrown.

The operation of my device is very simple. The stalks to be stripped of the corn ears are thrown upon the table forming frame and racked and stacked against the standards 28. As the corn is husked, the ears are thrown into the chute 32, while the stalks are thrown into the cradle, the operator standing between the posts 37 and 36. When a suitable amount of stalks have been collected within the cradle, the compressing frame comprising the member 62 is brought into play by grasping the handle 66 and carrying this compressing frame downward. One of the tying members 80 as used in my invention and which is in the form of a single piece of wire of a suitable length has previously been brought into engagement with the supporting eye 50, by means of the hooked end 82, the major portion of the tying member 80 being held within the spring 55 to prevent displacement. These tying members 80 are, of course, placed in position before any of the stalks are thrown into the cradle, and are of such a length, that when the hooked end 82 is in engagement with the eye 50, the opposite end can be secured below the spring holder 60, the wire being curved in conformity with the cradle members 14 and 19. In its secured position, the clamped end $x$, of the wire member 80 will extend horizontally from the slot 59 to the spring holder 60. Now as the compressing frame is carried downward, the hook 68 engages the hooked end 82 of the tying member and carries the same downward and past the horizontally held wire portion $x$. The finger 69, it will be noticed, is longer than the hooked end 82 of the tying member, so that this end 82 is permitted to pass below the horizontal wire section $x$ before the finger 69 comes into play. As the frame is carried downward, the finger 69 engages the wire section $x$, and sends the same downward. As the shock prevents the wire giving way through the slot 59, the end of the member 80 is finally carried from below the yoke 56, in which operation the member 80 will have been given a well defined crook $u$ within which the remaining end 82 is hooked, the wire end $z$ extending approximately at right angles to the crook as shown in Fig. 6. By this means the end of the tying members are securely connected, in such a manner, however, that the tying member may be released from the shock and be reused. In releasing the tying member the end $z$ forms and serves as a handle in breaking the connection.

The device is light, neat, simply constructed and readily operated.

Having thus described my invention what I claim is:—

1. The combination, with a suitable frame, of a cradle secured to said frame, a pivotally held compressing frame, a crimping member carried by said compressing frame including a downwardly extending hook and an oppositely directed finger, and a yoke positioned in the path of said hook and finger.

2. In a device of the character described, in combination with a wheel supported frame, of a rack slidably carried by said frame, standards hingedly secured to said rack, and a chute carried by said standards.

3. The combination, in a device of the character described, of a post, a supporting eye carried at the upper end of said post, a spring holding member secured below said eye, a cradle extending from said post, a yoke having a slot and a seat, a spring holder held proximal to said yoke, a pivotally held compressing frame comprising an extending hook arranged to pass below said supporting eye and an oppositely directed finger, said hook and finger being arranged to pass to the rear of said yoke.

4. The combination with a suitably supported cradle, a post carried by said cradle, a supporting eye secured to the upper end of said post, a spring holder secured below said supporting eye, a yoke having a slot, a second spring holder held proximal to said yoke, said first mentioned spring holder engaging the tie, a compressing frame pivotally secured adjacent to said cradle, and a hook arranged to engage the hooked end of said tie, a finger extending from said hook to engage said tie at a point between said slot and second mentioned spring holder to form a crimp engaged by the hooked end of said tie.

5. In a device of the character described, in combination with a cradle, of a supporting eye, a yoke having a slot, a holding member proximal to the slot of said yoke, a pivotally held compression frame, a hook carried by said compression frame arranged to engage and detach the hooked end of said tie from said engaging eye, said hooked end being carried below the remaining end of said tying member, and a projecting finger arranged to engage the extending end of said tying member to crook the same as for the purpose set forth.

In testimony whereof I affix my signature, in presence of two witnesses.

WILLIAM S. RUFFNER.

Witnesses:
F. H. RUFFNER,
ALMEDA RUFFNER.